US012652356B2

(12) United States Patent
Ambati et al.

(10) Patent No.: US 12,652,356 B2
(45) Date of Patent: Jun. 9, 2026

(54) METHODS AND SYSTEMS FOR CHARGING DEDUCTIONS DISREGARDING EXISTING RESERVATIONS UTILIZING PRIORITY RESOURCE BUCKETS

(71) Applicant: Telefonaktiebolaget LM Ericsson (publ), Stockholm (SE)

(72) Inventors: Suresh Babu Ambati, Andhra Pradesh (IN); Magnus Wedelin, Karlshamn (SE); Leila Negris Bezerra, Rio de Janeiro (BR); Alexandre Carvalho Lousada, Lyckeby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

(21) Appl. No.: 17/920,188

(22) PCT Filed: Mar. 4, 2021

(86) PCT No.: PCT/EP2021/055452
§ 371 (c)(1),
(2) Date: Oct. 20, 2022

(87) PCT Pub. No.: WO2021/213722
PCT Pub. Date: Oct. 28, 2021

(65) Prior Publication Data
US 2023/0344942 A1     Oct. 26, 2023

(30) Foreign Application Priority Data

Apr. 21, 2020     (IN) .............................. 202011017141

(51) Int. Cl.
*H04M 15/00*     (2024.01)
*H04W 4/24*     (2018.01)

(52) U.S. Cl.
CPC ......... *H04M 15/785* (2013.01); *H04M 15/64* (2013.01); *H04W 4/24* (2013.01)

(58) Field of Classification Search
CPC .. H04M 15/785; H04M 15/64; H04M 15/765; H04M 15/775; H04M 15/78;
(Continued)

(56) References Cited

U.S. PATENT DOCUMENTS

| | | | |
|---|---|---|---|
| 11,082,244 B2 * | 8/2021 | McNamee | ............ H04M 15/61 |
| 2006/0034438 A1 * | 2/2006 | O'Neill | ................. H04L 47/824 |
| | | | 379/114.07 |

(Continued)

OTHER PUBLICATIONS

International Search Report and Written Opinion issued in International Application No. PCT/EP2021/055452 dated Jun. 18, 2021 (10 pages).

*Primary Examiner* — Pakee Fang
(74) *Attorney, Agent, or Firm* — Sage Patent Group

(57) ABSTRACT

Systems and methods are provided for deducting resources from one or more resource buckets associated with a charge for a service used by a subscriber in a telecommunication system. The method including: receiving, at a node in the telecommunication system, a first message requesting a reservation of resources for the first service; reserving, at the node, resources for the first service from one or more available resource buckets according to a priority order; receiving, at the node in the telecommunication system after the reserving for the first service, a second message requesting a reservation of resources for a second service; reserving, at the node in the telecommunication system, resources for the second service from one or more available resource buckets according to the priority order; receiving, at the node in the telecommunication system, a message including a consumed amount of resources associated with the second service; and deducting, at the node in the telecommunication (Continued)

300 system, the consumed amount of resources associated with the second service by taking units from the resources which were previously reserved for the first service.

17 Claims, 7 Drawing Sheets

(58) Field of Classification Search
     CPC ... H04M 15/66; H04M 15/8083; H04W 4/24;
                                          H04L 12/1407
     See application file for complete search history.

(56)                    References Cited

U.S. PATENT DOCUMENTS

| 2008/0144493 | A1* | 6/2008 | Yeh | ................... | H04W 74/0816 |
| | | | | | 370/230 |
| 2016/0105785 | A1* | 4/2016 | Wiant | ................... | H04M 15/64 |
| | | | | | 455/406 |
| 2017/0048390 | A1* | 2/2017 | Bhatia | ................. | H04M 3/5175 |
| 2018/0167763 | A1* | 6/2018 | Nair | ...................... | H04M 15/64 |

* cited by examiner

400

500

700

METHODS AND SYSTEMS FOR CHARGING DEDUCTIONS DISREGARDING EXISTING RESERVATIONS UTILIZING PRIORITY RESOURCE BUCKETS

CROSS REFERENCE TO RELATED APPLICATIONS

This application is a 35 U.S.C. § 371 National Stage of International Patent Application No. PCT/EP2021/055452, filed 2021 Mar. 4, which claims priority to Indian Patent Application number 202011017141, filed on 2020 Apr. 21. The above identified application is incorporated by this reference.

TECHNICAL FIELD

The present invention generally relates to communication networks and, more particularly, to mechanisms and techniques for charging systems.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there need to be methods and systems for efficiently charging for services, particularly, as service offerings exist in a dynamic environment with expectations of increased volume and new types of services becoming available.

Regarding the charging for services, currently there is an Online Charging System (OCS) that supports unit (resource) reservation, either Event Charging with Unit Reservation (ECUR) or Session Charging with Unit Reservation (SCUR). These two existing solutions for charging subscribers for services focus on guaranteeing that when reported, consumed units are to be charged. These charged resources will be deducted following the corresponding previous resource reservations. Current systems also aim to ensure that reserved units for one service cannot be deducted by another service reporting consumptions. Deduction requests follow their own corresponding reservations, i.e., these deduction requests cannot take resources from other reservations.

This conventional approach which respects existing resource reservations when deducting assumes that reserved units will be entirely deducted later. Because of that assumption, the deduction of such reserved units is locked, preventing other usage reports to deduct any or all of these locked units. However, this assumption in the conventional approach is not always true in that the number of "reserved units" do not always correspond to the number of "deducted units" in the future when deduction gets reported. Also, for clarification, "requesting and consumption" reporting are actions associated with network service usage, by OCS users, with OCS users including Charging Trigger Functions (CTFs) that are clients of the OCS with "reservation and deduction" being actions associated with resource handling at the OCS. A consequence of this behavior is that after deduction, a subscriber may still have remaining units in higher prioritized accounts which were reserved but not deducted. The effect of this consequence is that those units, belonging to the higher prioritized resource bucket(s) were prevented from being deducted by other services/sessions because the original reservation was respected.

Therefore it can be said that in the conventional context of resource reservation and usage, that "reserved units" should be viewed as a speculation of how many units could be consumed instead of a guarantee of actually consumed units. Thus currently existing solutions associated with reserving/charging units can include scenarios where the correct, higher priority account is not fully consumed prior to consumption of buckets of resources with a lower priority. For example, promotions based on account consumption may be executed inaccurately, even when accounts with a higher priority are left with deductible balances.

Thus, there is a need to provide methods and systems that overcome the above-described drawbacks associated with charging deductions associated with reservations.

SUMMARY

Embodiments allow for a so-called "First come First serve" mechanism, which allows for a service request to deduct reported consumption of units or resources while ignoring existing reservations by depleting higher priority available accounts first. This can improve an end user's experience by taking units from a higher priority account before deducting from a lower priority account, e.g., a monetary account.

According to an embodiment, there is a method for deducting resources from one or more resource buckets associated with a charge for a service used by a subscriber in a telecommunication system. The method comprising: receiving, at a node in the telecommunication system, a first message requesting a reservation of resources for the first service; reserving, at the node in the telecommunication system, resources for the first service from one or more available resource buckets according to a priority order; receiving, at the node in the telecommunication system after the reserving for the first service, a second message requesting a reservation of resources for a second service; reserving, at the node in the telecommunication system, resources for the second service from one or more available resource buckets according to the priority order; receiving, at the node in the telecommunication system, a message including a consumed amount of resources associated with the second service; and deducting, at the node in the telecommunication system, the consumed amount of resources associated with the second service by taking units from the resources which were previously reserved for the first service.

According to an embodiment, there is a node in a telecommunication system for deducting resources from one or more resource buckets associated with a charge for a service used by a subscriber in the telecommunication system. The node comprising: a communication interface configured to receive a first message requesting a reservation of resources for the first service; a processor configured to reserve resources for the first service from one or more available resource buckets according to a priority order; the communication interface configured to receive, after the reserving for the first service, a second message requesting a reservation of resources for a second service; the processor configured to reserve resources for the second service from one or more available resource buckets according to the priority order; the communication interface configured to receive a message including a consumed amount of resources associated with the second service; and the processor configured to deduct the consumed amount of resources associated with the second service by taking units from the resources which were previously reserved for the first service.

According to an embodiment, there is a computer-readable storage medium containing a computer-readable code that when read by a processor causes the processor to perform a method for deducting resources from one or more resource buckets associated with a charge for a service used by a subscriber in a telecommunication system. The method comprising: receiving, at a node in the telecommunication system, a first message requesting a reservation of resources for the first service; reserving, at the node in the telecommunication system, resources for the first service from one or more available resource buckets according to a priority order; receiving, at the node in the telecommunication system after the reserving for the first service, a second message requesting a reservation of resources for a second service; reserving, at the node, resources for the second service from one or more available resource buckets according to the priority order; receiving, at the node in the telecommunication system, a message including a consumed amount of resources associated with the second service; and deducting, at the node in the telecommunication system, the consumed amount of resources associated with the second service by taking units from the resources which were previously reserved for the first service.

According to an embodiment, there is an apparatus adapted to receive a first message requesting a reservation of resources for the first service; to reserve resources for the first service from one or more available resource buckets according to a priority order; to receive, after the reserving for the first service, a second message requesting a reservation of resources for a second service; to reserve resources for the second service from one or more available resource buckets according to the priority order; to receive a message including a consumed amount of resources associated with the second service; and to deduct the consumed amount of resources associated with the second service by taking units from the resources which were previously reserved for the first service.

According to an embodiment, there is an apparatus comprising: a first module configured to receive a first message requesting a reservation of resources for the first service; a second module configured to reserve resources for the first service from one or more available resource buckets according to a priority order; a third module configured to receive, after the reserving for the first service, a second message requesting a reservation of resources for a second service; a fourth module configured to reserve resources for the second service from one or more available resource buckets according to the priority order; a fifth module configured to receive a message including a consumed amount of resources associated with the second service; and a sixth module configured to deduct the consumed amount of resources associated with the second service by taking units from the resources which were previously reserved for the first service.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with charging deductions associated with reservations. Embodiments described provide for a so-called "First come First serve" mechanism, which allows for a service request to deduct reported consumption of units or resources (units and resources are terms which are used interchangeably herein) while ignoring existing reservations. Examples of resources can include monetary resources and non-monetary resources, e.g., amounts of data, time, volume, events and the like. By following this First come First serve mechanism, deduction for reported consumption can always consider a priority order of accounts, starting with a highest priority bucket of resources, disregarding existing reservations, possibly taking units from other previous reservations on the same bucket of resources. Additionally, disregarding existing reservations for a given account can be controlled by configuring whether this mechanism is allowed for a given service or account, etc. Available resource buckets can, for example, be not previously consumed or reserved resource buckets.

According to an embodiment, using the First come First serve mechanism ensures that the reported consumed units will be deducted from the correct bucket of resources, which typically is always from the highest priority available account, first. To allow for control of possible losses to the operator of the telecommunication network over target accounts based on using these techniques, a configuration associated with a subscriber can indicate if a given account allows for disregarding existing reservations and if so, to what extent. If an account does not allow for disregarding existing reservations, a service request cannot deduct units reserved on that bucket of resources for another service.

Figure 1:
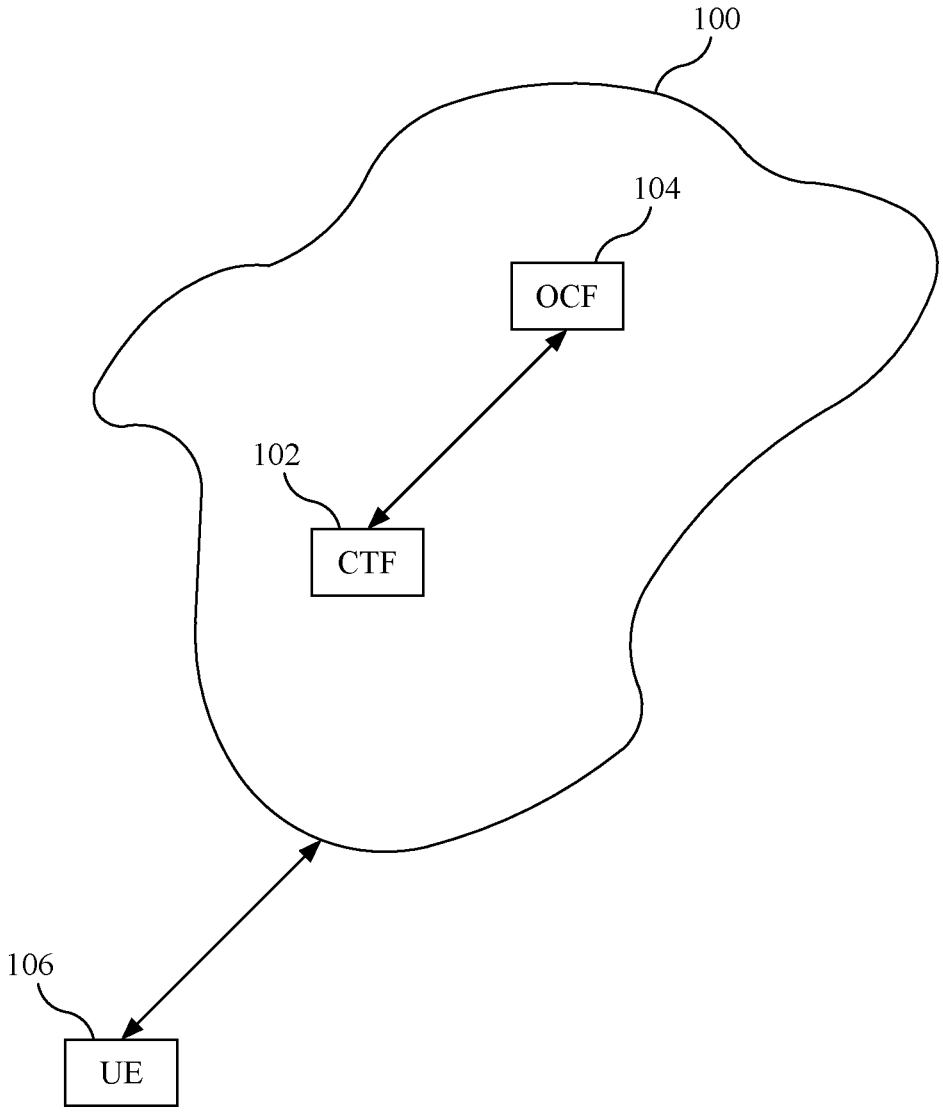
FIG. 1 illustrates an architecture according to an embodiment.

According to an embodiment, FIG. 1 illustrates an architecture which includes the nodes/functions used in support of the First come First serve mechanism. More specifically, FIG. 1 shows a User Equipment (UE)A 106 which is in communication with an operator network 100 (which is also a telecommunication network). The operator network 100 includes various nodes which have various methods for communicating with each other and/or getting information to/from the UE-A 106. Shown in operator network 100 are a Charging Trigger Function (CTF) 102, which can be implemented on a node, and an Online Charging Function (OCF) 104 which also can be implemented on a node. To simplify FIG. 1, the CTF 102 and the OCF 104 are the only nodes shown in the operator network 100 as they are the nodes of interest within the operator network 100 for discussion of embodiments herein. However, it is to be understood that other nodes exist which are not shown here through which communications associated with embodiment can be passed through.

Figure 2:
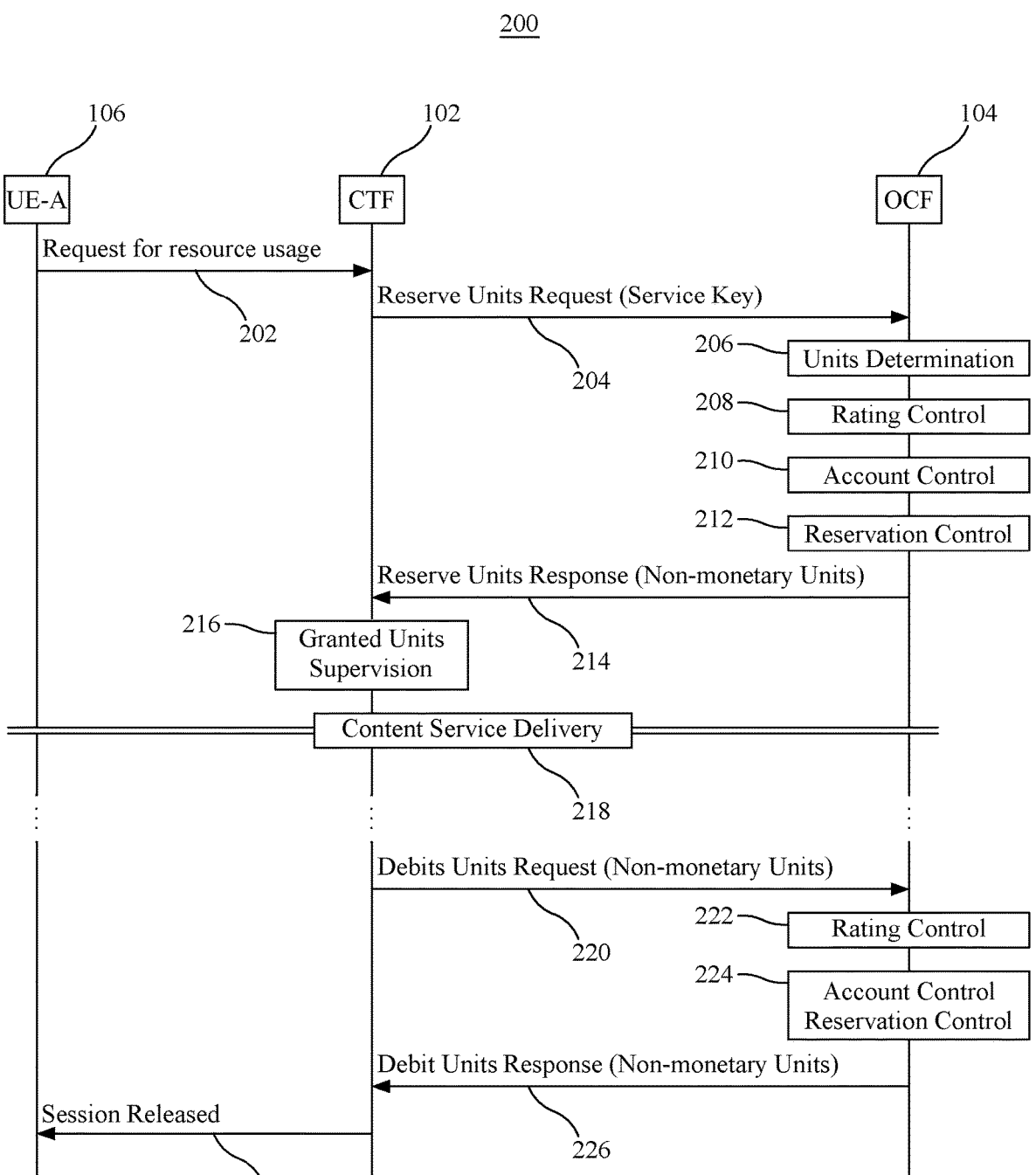
FIG. 2 shows a signaling diagram according to an embodiment.

According to an embodiment, FIG. 2 shows a signaling diagram 200 associated with the First come First serve mechanism in which previously made reservations can be discarded. While "non-monetary" units are used in this example for simplicity, other types of units can be used instead, e.g., monetary units, when desired. Further, the signaling shown in FIG. 2 is only one example of a signaling diagram which could be used to implement the First come First serve mechanism. The signaling diagram 200 shows communications between the UE-A 106, the CTF 102 and the OCF 104. Initially, the UE-A 106 requests the desired content from the CTF 102 as shown in the Request for resource usage message 202. The CTF 102, depending on the service requested by the UE-A 106, determines the service key and forwards the Reserve Units Request message 204 with a service key to the OCF 104.

The OCF 104, in Units Determination block 206 determines the number of non-monetary units needed for the content/service delivery, based on the received service key. The OCF 104 assisted by a rating entity then, in Rating Control block 208, calculates the number of monetary units that represent the price for the number of units determined in the Units Determination block 206. The OCF 104, as shown in Account Control block 210, checks whether a user's account balance, associated with the desired content request, is sufficient for the requested reservation. If the user's account balance is sufficient, then the corresponding reservation is made by the OCF 104 as shown by Reservation Control block 212. In this example, units from higher priority resource buckets are already reserved for other service requests. Hence, for this service request, units are reserved from a lower priority resource bucket.

According to an embodiment, the OCF 104 informs the CTF 102 of the reserved number of non-monetary units as shown in Reserve Units Response message 214. This includes the case where the number of units reserved indicates the permission to render the service that was identified by the received service key. The Granted Units Supervision block 216 performed by the CTF 102 is the process by which the CTF 102 monitors the consumption of the reserved units and can operate simultaneous with or in conjunction with the service delivery to the UE-A 106. Content/Service Delivery block 218 represents the CTF 102 delivering the content/ service which can happen at once, in fractions of the total or in individually chargeable items, corresponding to the reserved number of units.

Next, a Debit Units Request message 220 is transmitted from the CTF 102 to the OCF 104 which includes the request to debit the amount of units corresponding to the consumed number of units. The OCF 104, as assisted by the rating entity, calculates the number of monetary units to deduct from the subscriber's account as shown by Rating Control block 222.

According to an embodiment, block 224 includes Account Control and Reservation Control at the OCF 104. With respect to Account Control, the OCF 104 triggers the deduction of the calculated amount from the subscriber's account. For this example, at the time of deduction for the present service request, there are units in higher priority resource buckets which are reserved for other service requests. As the service and resource bucket configuration allows the operator to discard or ignore reservations while deducting units, units from the higher priority resource buckets can be deducted for the present service request, even when those units are reserved for some other service request. In this way, embodiments allow for an online charging framework which can make sure to completely deduct higher priority resource buckets available for the subscriber's service request, before deducting units from lower priority resource buckets.

With respect to Reservation Control, the OCF 104 can discard reservations made on other resource buckets for the present service request. The OCF 104 can then reauthorize those services which lost their reserved units due to the deduction of units, which were reserved for other service requests, for the present service request. This can be accomplished by, for example, sending a Diameter Re-Auth-Request (RAR) message. After completion of the various potential operations associated with Account Control and Reservation Control in block 224, the OCF 104 informs the CTF 102 of the actually deducted non-monetary units as shown in Debit Units Response message 226. The CTF 102 can then release the session with the UE-A 106 as shown by the Session Release message 228.

Embodiments described herein can be used in situations where there are more than one resource bucket available, e.g., more than one account associated with a subscriber each account having a different priority, where priority from higher to lower describes the resource bucket order for deducting, or taking, resources. These accounts and/or resource buckets are available for the subscriber to consume for content/services as performed by the operator of the network. With different priority order, the general, but not required, expectation is to consume from the higher priority resource bucket first, before consuming from a lower priority resource bucket. Further, both the content/service and the resource bucket configuration allow for discarding reservations made for other content/service requests, while deducting units for a given content/service request.

As used herein, "reserved units" can be considered as a speculation of what units/resources can be consumed. Disregarding reservations while deducting reported consumption may lead to loss of reserved balance for some services which may result in revenue loss for the operator of the telecommunication network. However, while embodiments can allow for the risk of some potential losses to provide an improved user experience, the operator can also set various configurations regarding where to allow or implement the First come First serve mechanism. For example, a configuration for this mechanism can be implemented on a resource bucket specification level so the operator can set for which accounts possible losses are acceptable. For another example, when the service is a promotion offered by, for example, the operator, services based on account consumption may be executed inaccurately when resource deductions accurately follow priority order.

According to an embodiment, when reported consumption cannot be deducted fully, corresponding account information from which the present reported consumption reserved shall be included in the event record. Configurations to enable this "disregard existing reservations while deducting reported usage" mechanism can be allowed at a service level. If desired, this configuration can also be enabled at a subscriber's account level. This allows for the configuration to be personalized for a given subscriber. According to another embodiment, when applicable, this "disregard existing reservations while deducting usage" mechanism can also be applied by the operator of the telecommunication network to any other appropriate entity level in the system for improving user experience while minimizing potential revenue losses due to this feature.

Figure 3:
FIG. 3 illustrates a use example according to an embodiment.
Figure 3:
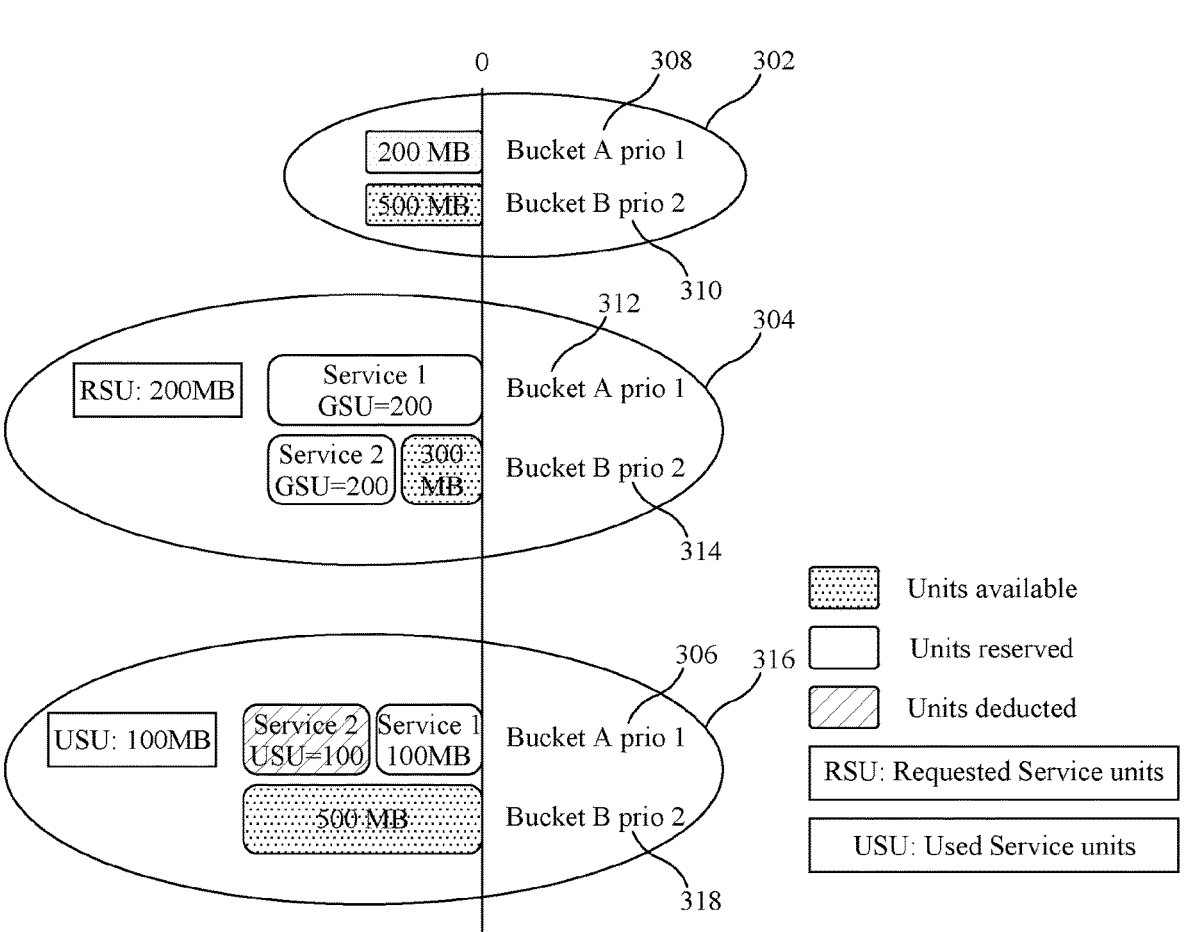

According to an embodiment, FIG. 3 shows a use example of the First come First serve mechanism. FIG. 3 includes a subscriber's current balances 302 which includes a 200 megabytes (MB) resource bucketA 308 with a first priority prio1 and a 500 MB resource bucketB 310 with a second priority prio2, where prio1 is of a higher priority level than prio2. The subscriber's reservations are shown in area 304 and area 316 shows used and deducted resources. For this use example, when deducting reported consumption the network operator has allowed its charging system to disregard reservations from other service requests for all resource buckets of this subscriber. A service, Service1 (shown in areas 304 by the 200 MB reserved service units (RSU)) has previously reserved all of the units on the highest priority resource bucket for the subscriber and a new parallel service, Service2 (also shown in areas 304 and 316) has requested 200 MB of units. Further, Service2 has reported consumption of 100 MB of units prior to a report of consumption associated with Service1.

With this background understood for the use example shown in FIG. 3, assume a request for 200 MB for use associated by Service2 is received by the OCF 104. Currently, as seen in area 304, BucketA 312 with prio1 is fully reserved for Service1. Thus, 200 MB is reserved from BucketB 314 with prio2 for Service2. Service2 then is delivered and reports consumption of 100 MB prior to the OCF 104 receiving any consumption reports associated with Service1. Since the First come First serve mechanism is enabled for this subscriber, even though Service1 has the 200 MB of granted service units (GSU) associated with Bucket A 312 as shown in area 304, the Service2 reported consumption shown as the used service units (USU) in area 316 will be deducted from BucketA 306 as seen in area 316. The existing reservation of Service2 on BucketB will be discarded. This can be seen in BucketB 318 which has its full 500 MB showing as available and not reserved in area 316. Additionally, Service1 will be reauthorized as the units reserved for Service1 are no longer available.

Figure 4:
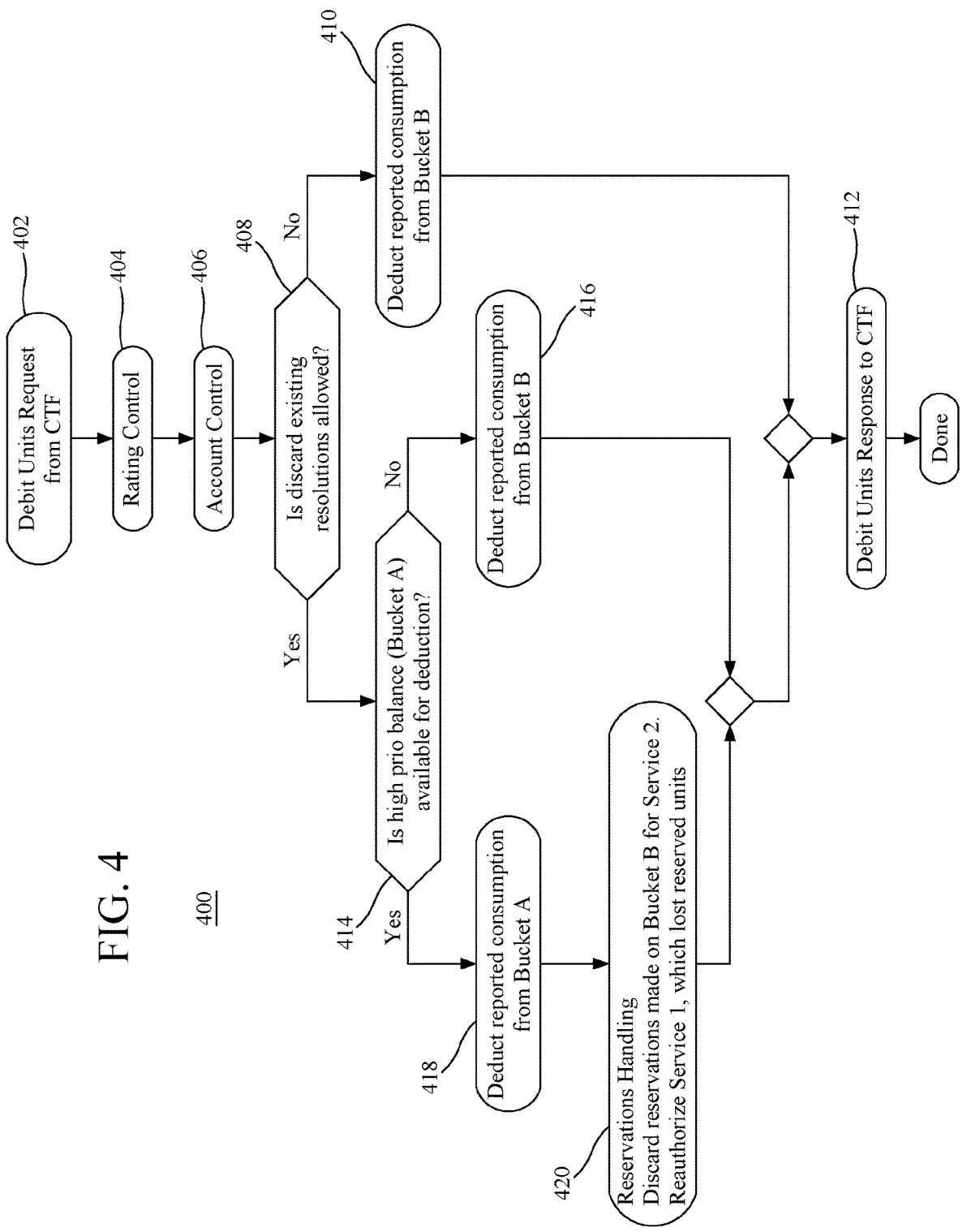
FIG. 4 shows a flowchart of the First come First serve mechanism according to an embodiment.

According to an embodiment, as shown in FIG. 4, there is a flowchart 400 which illustrates the First come First serve mechanism. Initially, a Debit Units Request is generated by the CTF 102 in step 402, which in this example is associated with service2. Next, Rating Control occurs in step 404 followed by Account Control in step 406. In step 408, a determination is made as to whether it is allowed to discard existing reservations or not. If the determination is no, then, in this example, the reported consumption is deducted from resource bucket B associated with service2 in step 410. Then a Debit Units Response is transmitted to the CTF 102 from the OCF 104 in step 412 which can then end this process.

According to an embodiment, if the determination is yes for discarding existing reservations, then, in this example, a check is made to see if there are one or more higher priority resource buckets available, e.g., resource bucket A. If there are no higher priority resource buckets available, then reported consumption is deducted from resource bucket B in step 416. If there is a higher priority resource bucket available, then reported consumption is deducted from the higher priority resource bucket, which in this example is resource bucket A, in step 418. Next, reservations handling occurs in step 420 which includes discarding reservations made on resource bucket B for service2 and to reauthorize resources for a service1 which lost its reserved resources in resource bucket A. Then, in step 412, the Debit Units Response is sent to the CTF 102 from the OCS 104 which ends this process. Additionally, when reserving resources from one or more resource buckets this can be done in partial amounts in various combinations. For example, two partial amounts from two different resource buckets to arrive at a desired amount of resources. According to an embodiment, another way to described how resources can be deducted, is if a second service requested for more units than the first service, the deduction for that second service will take units from reservation of the first service and also units from reservation of the second service.

Figure 5:
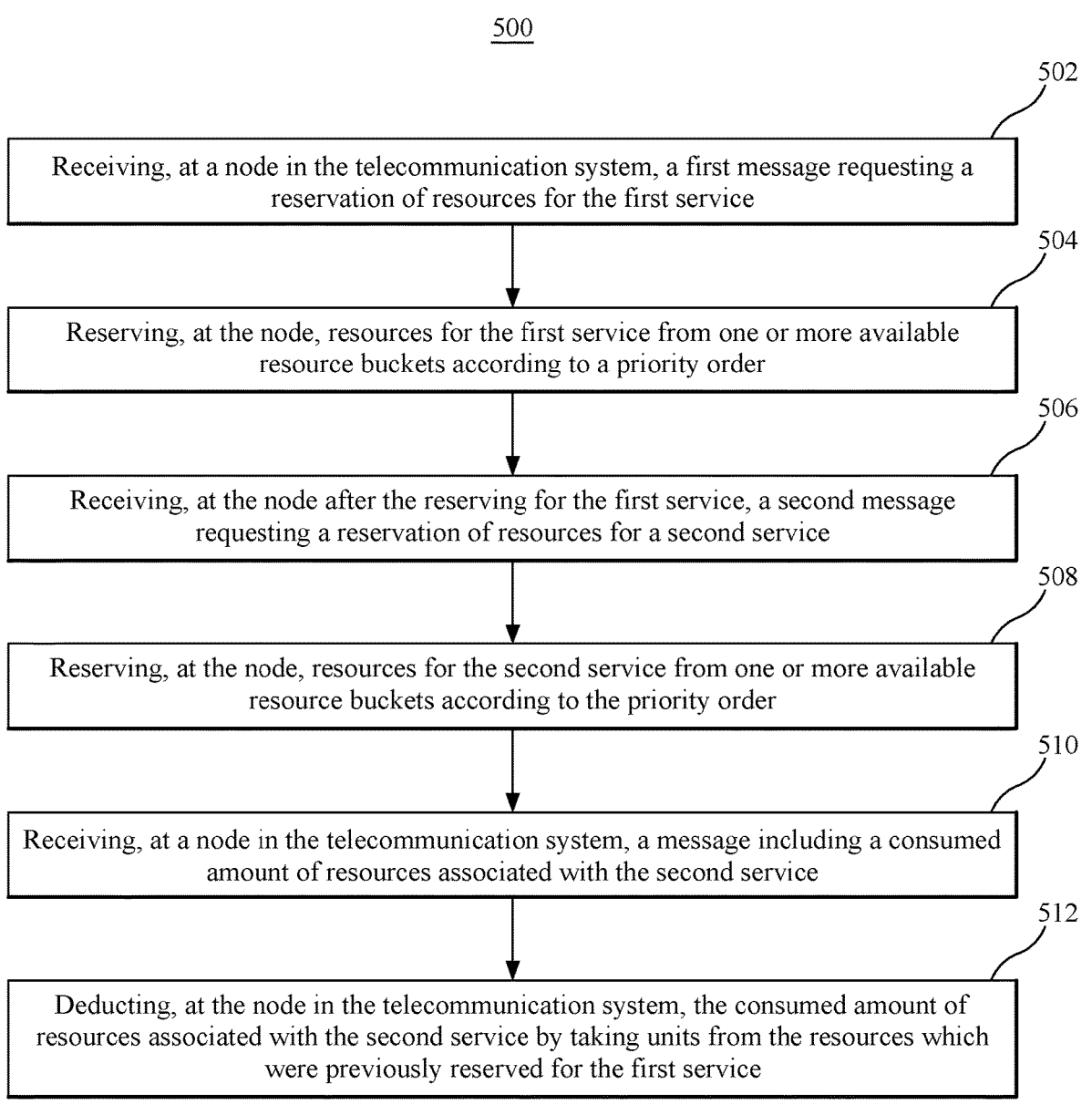
FIG. 5 shows a flowchart of a method for deducting resources from one or more resource buckets associated with a charge for a service used by a subscriber in a telecommunication system according to an embodiment.

According to an embodiment, there is a method 500 for deducting resources from one or more resource buckets associated with a charge for a service used by a subscriber in a telecommunication system as shown in FIG. 5. The method includes: in step 502, receiving, at a node in the telecommunication system, a first message requesting a reservation of resources for the first service; in step 504, reserving, at the node, resources for the first service from one or more available resource buckets according to a priority order; in step 506, receiving, at the node after the reserving for the first service, a second message requesting a reservation of resources for a second service; in step 508, reserving, at the node, resources for the second service from one or more available resource buckets according to the priority order; in step 510, receiving, at the node in the telecommunication system, a message including a consumed amount of resources associated with the second service; and in step 512, deducting, at the node in the telecommunication system, the consumed amount of resources associated with the second service by taking units from the resources which were previously reserved for the first service. In the previous sentence, the phrase "resources which were previously reserved" means the resources which are still reserved for the first service, when the second service consumption reporting is received at the OCS.

Figure 6:
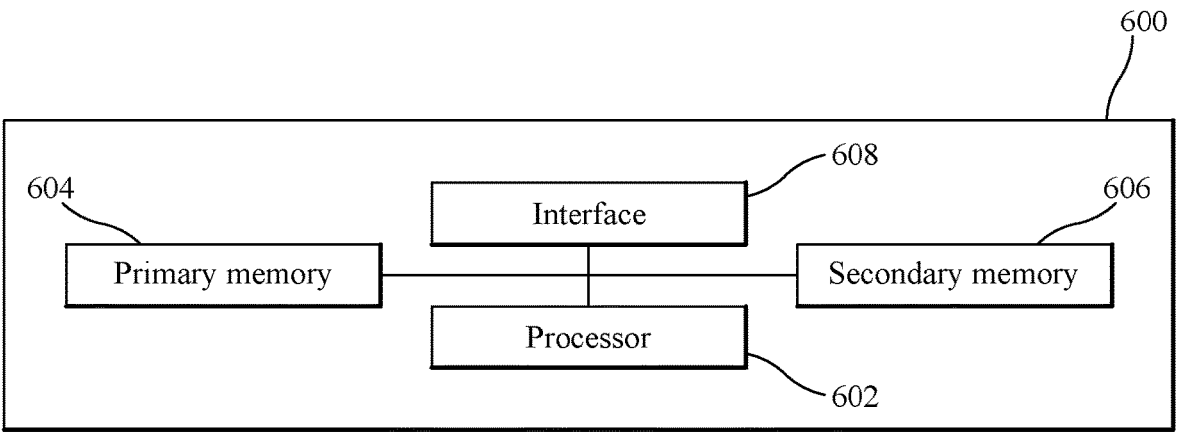
FIG. 6 depicts a communication node according to an embodiment.

Embodiments described above can be implemented in one or more nodes (or servers). An example of a communication node 600 is shown in FIG. 6. The communication node 600 (or other network node) includes a processor 602 for executing instructions and performing the functions described herein, e.g., the functions performed by the CTF 102, the OCF 104 and the UE-A 106. The communication node 600 also includes a primary memory 604, e.g., random access memory (RAM) memory, a secondary memory 606 which can be a non-volatile memory, and an interface 608 for communicating with other portions of a network or among various nodes/servers in support of charging.

Processor 602 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 600 components, such as memory 604 and/or 606, node 600 functionality in support of the various embodiments described herein. For example, processor 602 may execute instructions stored in memory 604 and/or 606.

Primary memory 604 and secondary memory 606 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 604 and secondary memory 606 may store any suitable instructions, data or information, including software and encoded logic, utilized by node 600. Primary memory 604 and secondary memory 606 may be used to store any calculations made by processor 602 and/or any data received via interface 608.

Communication node 600 also includes communication interface 608 which may be used in the wired or wireless communication of signaling and/or data. For example, interface 608 may perform any formatting, coding, or translating that may be needed to allow communication node 600 to send and receive data over a wired connection. Interface 608 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Embodiments provide various advantages or improvements for charging for services in a telecommunications network. For example, according to an embodiment, the First come First serve mechanism ensures that the subscriber will always deplete higher priority available accounts first, before consuming from other lower priority accounts. This mechanism also provides an improved user experience. For example, embodiments allow for fully exhausting a higher priority data account before deducting from a lower priority monetary account in, for example, euros (EUR). Further, the configuration per "Account Specification" of the First come First serve mechanism at deduction allows for the operator to set for which accounts possible losses are acceptable. Additionally, this allows for proper execution of operator designed activities like, for example, promotions, based on account consumption status.

Various embodiments described herein refer in some fashion to nodes, e.g., nodes which support functions associated with charging. In some embodiments the non-limiting communication node (also interchangeably called as node or telecommunication node) is more commonly used and it refers to any type of network node which directly or indirectly communicates with a user equipment (UE), a node in one or more operator networks, and a core network.

The disclosed embodiments provide methods and devices for deducting resources from one or more resource buckets associated with a charge for a service used by a subscriber in a telecommunication system. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 7:
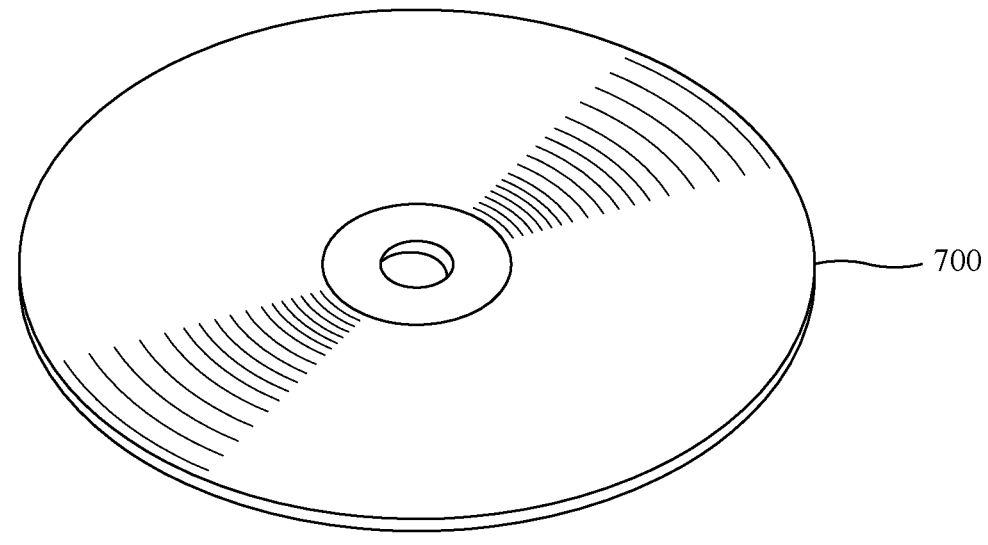
FIG. 7 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIG. 5, may take the form of a computer program product stored on a computer-readable storage medium having computer-readable instructions embodied in the medium. For example, FIG. 7 depicts an electronic storage medium 700 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for deducting resources from one or more resource buckets associated with a charge for a service used by a subscriber in a telecommunication system, the method comprising:

receiving, at a node in the telecommunication system, a first message requesting a reservation of resources for the first service;

reserving, at the node in the telecommunication system, resources for the first service from one or more available resource buckets according to a priority order, the first service reserves resources from a first resource bucket;

receiving, at the node in the telecommunication system after the reserving for the first service, a second message requesting a reservation of resources for a second service;

reserving, at the node in the telecommunication system, resources for the second service from one or more available resource buckets according to the priority order, the second service reserves resources from a second resource bucket;

receiving, at the node in the telecommunication system, a message including a consumed amount of resources associated with the second service; and deducting, at the node in the telecommunication system, the consumed amount of resources associated with the second service by taking units from the resources which were previously reserved for the first service, wherein units from a higher priority resource buckets are deducted for the second service, even the units are reserved for other service.

2. The method of claim 1, wherein the first resource bucket has a higher priority than the second resource bucket.

3. The method of claim 1, further comprising:

transmitting, from the node in the telecommunication system, a reauthorization message indicating reauthorization of resources associated with the first service which lost reserved resources due to the deduction of resources associated with the second service.

4. The method of claim 1, wherein the priority of the resource buckets is determined by an operator of a network.

5. The method of claim 1, further comprising:

discarding, at the node in the telecommunication system, reservations associated with resources made for the second service in the one or more available resource buckets which were unconsumed because the second service took the reservation of resources from the first service.

6. The method of claim 1, wherein the node is an Online Charging Function node.

7. The method of claim 1, wherein the one or more available resource buckets include a monetary resource or a non-monetary resource.

8. The method of claim 1, wherein the one or more available resource buckets include a monetary resource, and a non-monetary resource comprising an amount of data.

9. A node in a telecommunication system for deducting resources from one or more resource buckets associated with a charge for a service used by a subscriber in the telecommunication system, the node comprising:

a communication interface configured to receive a first message requesting a reservation of resources for the first service;

a processor configured to reserve resources for the first service from one or more available resource buckets according to a priority order, the first service reserves resources from a first resource bucket;

the communication interface configured to receive, after the reserving for the first service, a second message requesting a reservation of resources for a second service;

the processor configured to reserve resources for the second service from one or more available resource buckets according to the priority order, the second service reserves resources from a second resource bucket;

the communication interface configured to receive a message including a consumed amount of resources associated with the second service; and the processor configured to deduct the consumed amount of resources associated with the second service by taking units from the resources which were previously reserved for the first service, wherein units from a higher priority resource buckets are deducted for the second service, even the units are reserved for other service.

10. The node of claim 9, wherein the first resource bucket has a higher priority than the second resource bucket.

11. The node of claim 9, further comprising:

the communication interface configured to transmit a reauthorization message indicating reauthorization of resources associated with the first service which lost reserved resources due to the deduction of resources associated with the second service.

12. The node of claim 9, wherein the priority of the resource buckets is determined by an operator of a network.

13. The node of claim 9, further comprising:

the processor configured to discarding reservations associated with resources made for the second service in the one or more available resource buckets which were unconsumed because the second service took the reservation of resources from the first service.

14. The node of claim 9, wherein the node is an Online Charging Function node.

15. The node of claim 9, wherein the one or more available resource buckets include a monetary resource or a non-monetary resource.

16. The node of claim 9, wherein the one or more available resource buckets include a monetary resource, and a non-monetary resource comprising an amount of data.

17. A non-transitory computer-readable storage medium containing a computer-readable code that when read by a processor causes the processor to perform a method for deducting resources from one or more resource buckets associated with a charge for a service used by a subscriber in a telecommunication system, the method comprising:

receiving, at a node in the telecommunication system, a first message requesting a reservation of resources for the first service;

reserving, at the node in the telecommunication system, resources for the first service from one or more available resource buckets according to a priority order, the first service reserves resources from a first resource bucket;

receiving, at the node in the telecommunication system after the reserving for the first service, a second message requesting a reservation of resources for a second service;

reserving, at the node in the telecommunication system, resources for the second service from one or more available resource buckets according to the priority order, the second service reserves resources from a second resource bucket;

receiving, at the node in the telecommunication system, a message including a consumed amount of resources associated with the second service; and deducting, at the node in the telecommunication system, the consumed amount of resources associated with the second service by taking units from the resources which were previously reserved for the first service, wherein units from a higher priority resource buckets are deducted for the second service, even the units are reserved for other service.

* * * * *